F. C. WARNE.
TRACTOR DRAWN TILLAGE IMPLEMENT.
APPLICATION FILED DEC. 4, 1918.
1,384,790.
Patented July 19, 1921.
2 SHEETS—SHEET 2.
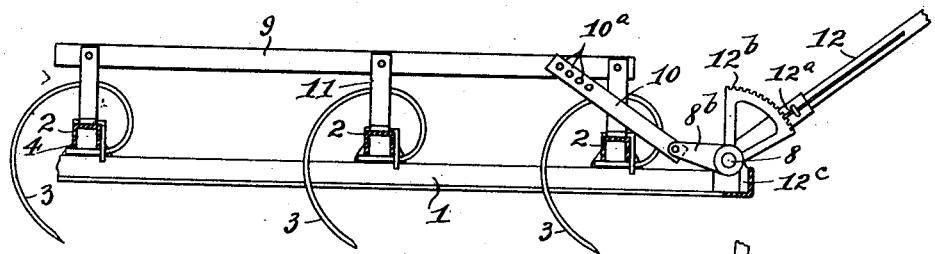
Fig. 3
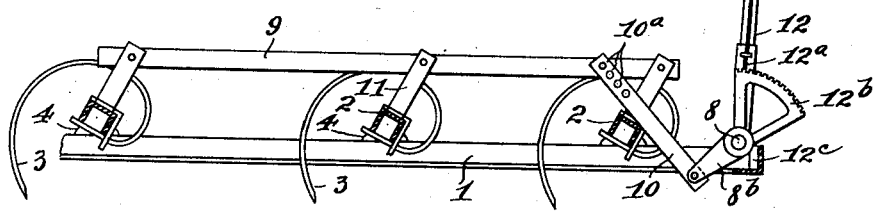
Fig. 4
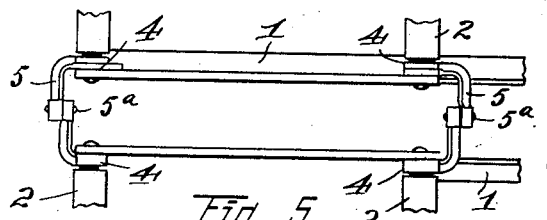
Fig. 5
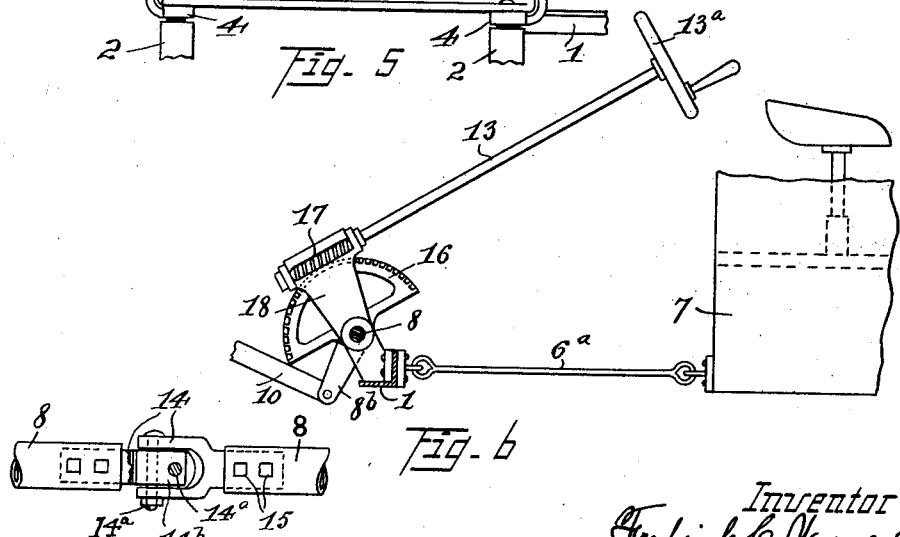
Fig. 6
Fig. 7
Inventor
Frederick C. Warne
By And L. Billman Atty.

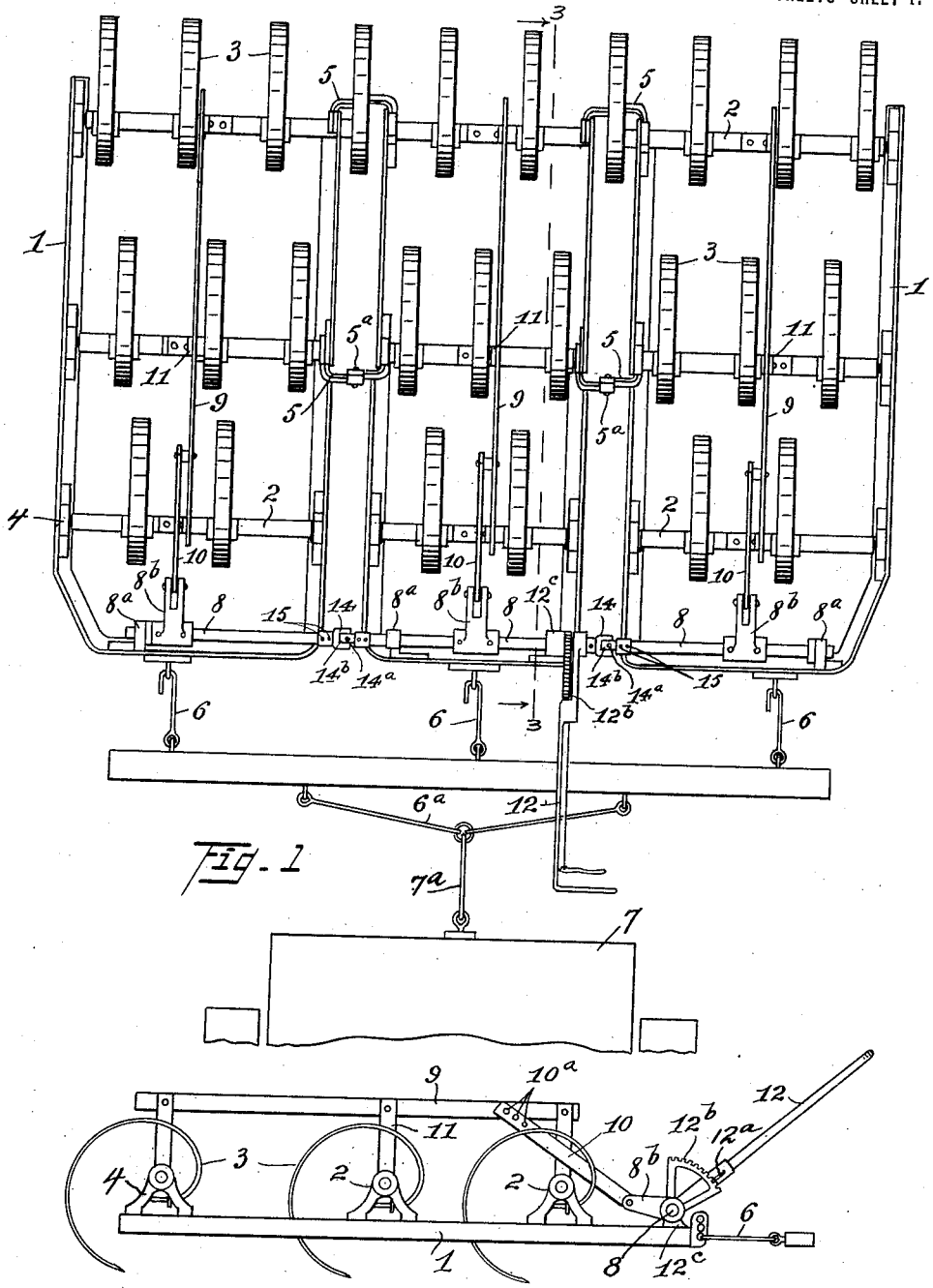

UNITED STATES PATENT OFFICE.

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

TRACTOR-DRAWN TILLAGE IMPLEMENT.

1,384,790.     Specification of Letters Patent.     Patented July 19, 1921.

Application filed December 4, 1918. Serial No. 265,303.

*To all whom it may concern:*

Be it known that I, FREDERICK C. WARNE, a citizen of the United States, residing at Mansfield, in the county of Richland and State of Ohio, have invented certain new and useful Improvements in Tractor-Drawn Tillage Implements, of which the following is a specification.

My invention relates to improvements in tractor drawn tillage implements, and more particularly to that class or type commonly known as "harrows," in which earth working elements in the specific form of spring or spike teeth are employed.

The primary object of the invention is to provide a generally improved implement of this class, which will be exceedingly simple in construction, and efficient in operation, and with this end in view, the improvements relate particularly to improved operating and controlling mechanism positioned to be reached by the operator of a tractor while in the seat or cab of the latter, whereby all of the tooth carrying bars in the respective frame units may be simultaneously moved and adjusted while the tractor is in motion to meet the varying demands of actual service and as the operator may elect.

A further object is the provision of improved unitary means operable from a tractor whereby all of the tooth bars, comprised in any desired number of flexibly connected frame units, may be operated and controlled in the variable transverse horizontal positions assumed by the frame units in conforming to the surface being cultivated.

A still further object is the provision of improved tooth bar operating and controlling mechanism which may not only be readily attached to the tooth carrying bars, (carrying earth working elements of any desired or suitable form) of a number of frame units, and which may be operated by the operator of a tractor with a minimum expenditure of energy, but also one which will not only possess the necessary flexibility, but may be readily adjusted to the tooth carrying bars comprised in the various frame sections in alining and adjusting the teeth to compensate for wear or slight distortion in the connections, thereby enabling the teeth to be maintained at a uniform depth and inclination throughout the entire width of the implement, and thus preventing side draft and giving uniform cultivation, as desired in implements of this class.

With the above mentioned and other ends in view, my invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a top plan view of a tractor drawn tillage implement in the specific form of a spring tooth harrow embodying my improvements, the teeth and improved tooth bar actuating and adjusting mechanism being shown in their down or earth working positions.

Fig. 2, a side elevation of the same.

Fig. 3, an enlarged longitudinal section view, taken on line 3—3, of Fig. 1.

Fig. 4, a similar view showing the teeth and tooth bar actuating and adjusting mechanism in a partially reversed or up position or an intermediate position in moving the teeth out of contact and the harrow frame runners into contact with the subjacent surface for clearing the teeth, transportation, or the like.

Fig. 5, an enlarged fragmentary top plan view of the flexible connections or couplings between two connected frame units or harrow sections.

Fig. 6, a side elevation of a modified form of tooth bar actuating and adjusting mechanism, positioned for operation from a tractor.

Fig. 7, an enlarged detailed view of one of the flexible connections or couplings of the tooth bar actuators or shafts between the harrow units or sections, thereby permitting the simultaneous operation and adjustment of the tooth bar actuator shaft and the tooth bars in the respective frame units or sections in the variable relative horizontal positions assumed by such units or sections in conforming to the surface being cultivated.

Similar numerals of reference designate like parts throughout all the figures of the drawings.

Upon reference to the accompanying drawings, it will be seen that I have applied my improvements to a tillage implement of the multiple section spring tooth harrow type, but it will, of course, be obvious from the following description, taken in connection with the accompanying drawings, that the inventions or improvements are capable of a wide use and application in connection with tractor drawn implements. In adapting my improvements for use in connection with an implement of this class I provide the tooth bar actuating mechanism with suitable moving and adjusting unitary means positioned at the front of the implement and in suitable proximity to the operator of the tractor, whereby such mechanism may be operated and adjusted by such operator while seated on the seat of the tractor or upon the tractor platform while the tractor is in motion, as will hereinafter more fully appear.

The harrow frames or sections 1, may be of any suitable and convenient form, and so likewise as to the tooth bars 2, and the earth working elements or teeth 3, which, in the present instance, are in the specific form of spring teeth suitably secured on the tooth carrying bars 2, the latter, in the present instance, being rotatably mounted in suitable bearing standards or brackets 4.

The frame units or sections 1, may be flexibly connected to each other in any suitable and convenient manner, as for example,—by means of flexible connections consisting, in the present instance, of hinge members 5, pivotally connected to each other by means of bearing or hinge bolts 5ª, by means of which such units or sections are flexibly connected to each other in any desired series, and which connections permit the frame units or sections to assume variable horizontal positions in conforming to the surface being cultivated. The draft appliance 6, may likewise be of any suitable and convenient form and connected to the harrow units or sections in any desired manner, as likewise the connections to the draw bar 7ª, of the tractor platform 7, as illustrated in Figs. 1 and 6, of the drawings. In Fig. 6, of the drawings it will be seen that the sections 1, are directly connected by the links 6ª, instead of indirectly thereto by means of the evener bar shown in Figs. 1 and 2, of the drawings.

The foregoing parts forming no specific part of my invention, and being well known to those skilled in the art to which this invention appertains, the same need not be described in detail.

Referring now to the improved tooth bar actuating mechanism and the unitary adjusting means for moving the same, and positioned at the front for convenient operation from a tractor, to which this invention particularly relates, and whereby any desired number of frame units or sections may be flexibly connected and the respective tooth bars in the respective frames or sections simultaneously moved and adjusted, as desired, it will be seen that I provide each frame unit or section 1, (in the present instance at the front thereof) with a movable tooth bar actuator 8, in the present instance, in the specific form of a rock shaft mounted in bearing members 8ª, and provided with a crank arm 8ᵇ, flexibly and adjustably connected to a shifting bar or member 9, by means of a connecting link 10. The shifting bar 9, may be movably and flexibly connected to the tooth bars 2, in any desired and convenient manner, as for example,—by means of suitable standards 11, leading from the tooth bars 2.

The improved tooth bar actuator moving and adjusting means, positioned at the front for convenient operation from a tractor, comprises, in the present instance, unitary adjusting means, in the specific form of a lever 12, leading forwardly to the operator of the tractor, as shown most clearly in Fig. 1, of the drawings, or if desired, a forwardly extending shaft 13, having a hand wheel 13ª and connected as there shown and as hereinafter described more fully as to its connections with the actuator shaft 8.

In the form shown in Figs. 1 to 4, inclusive, of the drawings, the lever 12, is mounted on the shaft 8, and is adapted to operate by means of a detent 12ª, operating in adjustable coöperative relation with a ratchet segment 12ᵇ, forming a part of a supporting bracket 12ᶜ, for supporting one end of the actuator shaft 8.

As a means of flexibly and detachably connecting the tooth bar actuator shafts 8, together, where a plurality of frame units or sections 1, are employed, and particularly as a means whereby such actuator shafts 8, and the respective tooth bars 2, of each section or unit may be simultaneously actuated in the variable relative horizontal positions assumed by such frame units or sections, the ends of the actuator shafts are flexibly connected together by means of flexible couplings, said couplings, in the present instance, comprising universal forked coupling members 14, flexibly and detachably connected to each other by means of cross bearing bolts 14ª, extending through suitable openings in a loosely mounted connecting block 14ᵇ, (see Fig. 7, of the drawings) said coupling members 14, being secured, in the present instance, to the adjacent actuator shaft by means of connecting bolts 15, passing through the ends of the shaft 8, (in the present instance in the form of a pipe shaft) and through the stem portions of the coupling members 14.

As a means of adjusting the various tooth bar actuators 8, to the various tooth carrying bars comprised in the various frame sections in alining and adjusting the teeth to compensate for wear or slight distortion in the connections, thereby enabling the teeth to be maintained at a uniform depth ad inclination throughout the entire width of the implement, and thus preventing side draft and giving uniform cultivation throughout the width of the implement, the ends of the links 10, are provided with adjusting openings 10ª, for receiving and carrying the bearing bolts connected to the shifting bars or members 9.

Referring to the form of tooth bar actuator moving and adjusting means, shown in Fig. 6, of the drawings, it will be seen that the actuator shaft 8, is provided with a worm gear 16, mounted upon and adapted to move the shaft 8, said gear meshing with a worm 17, mounted on the actuating shaft 13, and the latter being mounted in a suitable supporting bracket 18, leading upwardly from the front of the frame section 1, and also forming a supporting bearing for the actuator shaft 8, it being obvious in this construction that a very wide and fine range of adjustment is provided for the actuator moving and adjusting mechanism.

From the foregoing description, taken in connection with the accompanying drawings, the operation and advantages of my invention will be readily understood.

Having thus described some of the embodiments of my invention, what I claim and desire to secure by Letters Patent, is,—

1. In a harrow, including flexibly connected transversely arranged master and auxiliary sections, tooth bar actuators on each section flexibly connected to each other, and actuator moving and adjusting means positioned on said master section, said tooth bar actuators on each section being independently adjustable for alining the teeth of said master and auxiliary sections.

2. In a tillage implement, flexibly connected master and auxiliary sections each provided with transversely extending tooth carrying bars, tooth bar moving mechanism on each section flexibly connected between the sections, means for adjusting said tooth carrying bars of each section independently whereby the teeth of each section are held in alinement to prevent side draft, and means for locking the tooth bar moving mechanism.

3. In a multiple section tillage implement, a master section provided with a plurality of transversely arranged and alining earth working elements, means on said section for simultaneously moving and adjusting said earth working elements, master actuating and adjusting mechanism on said master harrow section, and means for connecting adjacent sections of like form thereto and operating the earth working elements therefrom said master section.

4. In a tillage implement, transversely arranged flexibly connected frame units each provided with transversely arranged earth working elements in alinement with each other, means on each frame unit for actuating and adjusting said earth working elements including flexible connections between said frame units, and master actuating and adjusting mechanism on one of the frame units for simultaneously operating and adjusting all of said earth working elements in the variable horizontal positions of said frame units.

5. In a multiple section tillage implement, flexibly connected master and auxiliary sections each provided with earth working elements, main and auxiliary adjusting mechanism on each of said sections flexibly connected therebetween, and means for adjusting said earth working elements of each section to compensate for wear or distortion in the connections whereby the elements of each section will be held in alinement relative to each other to prevent side draft and give uniform cultivation through uniform angle and depth of the earth working elements.

6. In a multiple frame harrow, including master and auxiliary frame sections each provided with adjustable transverse tooth bars in alinement with each other, tooth bar actuators on each frame section flexibly and detachably connected to each other and to said tooth bars, means between said actuators of each frame section and the respective tooth bars carried thereby for adjusting the same to carry the tooth bars in the same relative positions throughout the width of the harrow as a whole, and master actuator moving and adjusting means on said master harrow frame section.

7. In a multiple frame harrow, including flexibly connected transversely extending frame units and tooth bars, tooth bar actuators on said frame units flexibly and detachably connected to each other between said frame units, means for adjusting the connections between said tooth bar actuators to hold the same in uniform relative positions, means on each frame unit between the respective tooth bars thereof and the respective tooth bar actuators whereby the tooth bars of each frame unit may be adjusted to hold the teeth thereof in alinement and of the same angle and depth throughout the entire width of the implement, and master actuator moving and adjusting means on one of said frame units for simultaneously actuating said tooth bars and teeth.

8. In a harrow including flexibly connected transversely arranged harrow sections each provided with transversely extending alining tooth bars, tooth bar actuating means detachably and flexibly connected between said harrow sections and provided with master actuating and adjusting mechanism on one of said harrow sections whereby said tooth bars may be simultaneously actuated, and means for adjusting the connections on each harrow section and the respective tooth bars carried thereby to compensate for wear or distortion between the connections whereby the tooth bars will be held in alinement to prevent side draft and give uniform cultivation by the teeth carried by said tooth bars.

In testimony whereof I have affixed my signature.

FREDERICK C. WARNE.